(12) United States Patent
Gross et al.

(10) Patent No.: US 7,181,651 B2
(45) Date of Patent: Feb. 20, 2007

(54) DETECTING AND CORRECTING A FAILURE SEQUENCE IN A COMPUTER SYSTEM BEFORE A FAILURE OCCURS

(75) Inventors: Kenny C. Gross, San Diego, CA (US); Lawrence G. Votta, Jr., Sammamish, WA (US); Adam Porter, Bethesda, MD (US)

(73) Assignee: Sun Microsystems, Inc., Santa Clara, CA (US)

( * ) Notice: Subject to any disclaimer, the term of this patent is extended or adjusted under 35 U.S.C. 154(b) by 520 days.

(21) Appl. No.: 10/777,532

(22) Filed: Feb. 11, 2004

(65) Prior Publication Data

US 2005/0188263 A1 Aug. 25, 2005

(51) Int. Cl.
  *G06F 11/00* (2006.01)
(52) U.S. Cl. ............... 714/37; 714/38; 714/39; 714/47
(58) Field of Classification Search ........... 714/37, 714/38, 39, 47
  See application file for complete search history.

(56) References Cited

U.S. PATENT DOCUMENTS

| | | | | |
|---|---|---|---|---|
| 4,937,763 | A | 6/1990 | Mott | 364/550 |
| 5,668,944 | A * | 9/1997 | Berry | 714/47 |
| 5,680,541 | A * | 10/1997 | Kurosu et al. | 714/26 |
| 5,937,366 | A | 8/1999 | Zbytniewski et al. | 702/108 |
| 6,412,026 | B1 | 6/2002 | Graf | 710/18 |
| 6,594,784 | B1 * | 7/2003 | Harper et al. | 714/47 |
| 6,629,266 | B1 * | 9/2003 | Harper et al. | 714/38 |
| 7,006,947 | B2 * | 2/2006 | Tryon et al. | 702/183 |
| 7,020,595 | B1 * | 3/2006 | Adibhatla et al. | 703/7 |
| 7,076,695 | B2 * | 7/2006 | McGee et al. | 714/47 |
| 2002/0133757 | A1 * | 9/2002 | Bertman et al. | 714/47 |
| 2002/0174384 | A1 * | 11/2002 | Graichen et al. | 714/37 |
| 2003/0065986 | A1 * | 4/2003 | Fraenkel et al. | 714/47 |
| 2003/0070120 | A1 * | 4/2003 | Michael et al. | 714/38 |

OTHER PUBLICATIONS

Publication entitled "Proactive Detection of Software Aging Mechanisms in Performance Critical Computers," by Kenny C. Gross et al., Proceedings of the 27th Annual NASA Goddard/IEEE Software Engineering Workshop, Dec. 2002, XP010639828, pp. 17-23.

* cited by examiner

*Primary Examiner*—Scott Baderman
*Assistant Examiner*—Tim Bonura
(74) *Attorney, Agent, or Firm*—Park, Vaughan & Fleming, LLP

(57) ABSTRACT

One embodiment of the present invention provides a system that detects a failure sequence that leads to undesirable computer system behavior and that subsequently takes a corresponding remedial action. During operation, the system receives instrumentation signals from the computer system while the computer system is operating. The system then uses these instrumentation signals to determine if the computer system is in a failure sequence that is likely to lead to undesirable system behavior, such as a system crash, wherein the determination involves considering predetermined multivariate correlations between multiple instrumentation signals and a failure sequence that is likely to lead to undesirable system behavior. Next, if the computer system is in a failure sequence that is likely to lead to undesirable system behavior, the system takes a remedial action.

21 Claims, 2 Drawing Sheets

DETECTING AND CORRECTING A FAILURE SEQUENCE IN A COMPUTER SYSTEM BEFORE A FAILURE OCCURS

BACKGROUND

1. Field of the Invention

The present invention relates to techniques for enhancing availability and reliability within computer systems. More specifically, the present invention relates to a method and an apparatus for proactively detecting and correcting a failure sequence that leads to undesirable computer system behavior.

2. Related Art

As electronic commerce grows increasingly more prevalent, businesses are increasingly relying on enterprise computing systems to process ever-larger volumes of electronic transactions. A failure in one of these enterprise computing systems can be disastrous, potentially resulting in millions of dollars of lost business. More importantly, a failure can seriously undermine consumer confidence in a business, making customers less likely to purchase goods and services from the business. Hence, it is desirable to be able to detect and correct failure sequences in computer systems before catastrophic system failures occur. (Note that the following disclosure and attached claims use the term "failure sequence" to refer to a sequence that leads to undesirable system behavior, such as a system crash or a system overload. This term is not meant to be limited to sequences that lead to system failures.)

One strategy for dealing with complex systems in safety-critical and mission-critical operations is called Condition Based Maintenance (CBM). The concept underpinning CBM is straightforward: proactively detect component failures, then isolate, replace, repair, or reconfigure before the component failures lead to a total system failure. However, in practice, it is difficult to prepare those learning CBM maintenance procedures for the psychological stresses involved in receiving and acting upon multiple sources of incoming information defining the state of the system, then taking correct actions expeditiously before cascading failures can lead to system catastrophe. Aviation pilots are first introduced to this environment in full-fidelity flight simulators. Nuclear reactor operators are similarly trained with full-fidelity plant simulators. In both cases, the large investment in simulation technology and in re-creating realistic human-computer interfaces (HCIs) is warranted because of the consequences of under-training, or training with unrealistic scenarios.

Although business critical eCommerce datacenters do not have life-critical aspects as in the foregoing examples; the psychological stresses and potential for cognitive-overload scenarios are nevertheless very high. In fact, when multiple system components fail at the same time human system operators can suffer from cognitive overload, which impedes the human operator's ability to take effective remedial actions. For example, there may be situations wherein error messages are coming from multiple locations in the software "stack" and the human system operator gets to the point of cognitive overload.

Some systems aid the human operator by monitoring system parameters, such as the amount of free memory, and will trigger an alarm if a parameter exceeds or falls below a pre-specified univariate threshold value. This enables the system or the system operator to perform a remedial action before the system crashes.

Unfortunately, univariate thresholds are often poor predictors of an impending system crash. In many cases, a univariate threshold will fail to predict a crash until it is too late to take remedial action. Note that it is possible to set a threshold lower (or higher) to make it more likely to predict a crash. However, doing so result in a "false positive" detection of undesirable system behavior, which can cause remedial actions to be taken when they are not necessary and can consequently lead to inefficient resource utilization.

Hence, what is needed is a method and an apparatus that more effectively detects and corrects failure sequence that leads to undesirable computer system behavior.

SUMMARY

One embodiment of the present invention provides a system that detects a failure sequence that leads to undesirable computer system behavior and that subsequently takes a corresponding remedial action. During operation, the system receives instrumentation signals from the computer system while the computer system is operating. The system then uses these instrumentation signals to determine if the computer system is in a failure sequence that is likely to lead to undesirable system behavior, wherein the determination involves considering predetermined multivariate correlations between multiple instrumentation signals and a failure sequence that is likely to lead to undesirable system behavior. Next, if the computer system is in a failure sequence that is likely to lead to undesirable system behavior, the system takes a remedial action.

In a variation on this embodiment, taking the remedial action involves generating an alarm.

In a further variation, generating the alarm involves communicating the alarm to a system administrator so that the system administrator can take the remedial action.

In a further variation, communicating the alarm to the system administrator involves communicating information specifying the nature of the failure sequence to the system administrator.

In a variation on this embodiment, taking the remedial action can involve: killing processes, blocking creation of new processes, or throwing away work, until the system is no longer in a failure sequence that is likely to lead to undesirable system behavior, such as a system crash. Although a few users are irritated by their processes being killed, a greater good is served by keeping the server running for possibly hundreds of users.

In a variation on this embodiment, determining if the computer system is in a failure sequence involves: deriving estimated signals for a number of instrumentation signals, wherein each estimated signal is derived from correlations with other instrumentation signals. It also involves comparing an actual signal with an estimated signal for a number of instrumentation signals to determine whether the computer system is in a failure sequence.

In a variation on this embodiment, comparing an actual signal with an estimated signal involves using sequential detection methods to detect changes in a relationship between the actual signal and the estimated signal.

In a further variation, the sequential detection methods include the Sequential Probability Ratio Test (SPRT).

In a variation on this embodiment, prior to deriving the estimated signal, the system determines correlations between instrumentation signals in the computer system, whereby the correlations can subsequently be used to generate estimated signals.

In a further variation, determining the correlations involves: deliberately overloading the computer system during a test mode to produce undesirable system behavior, such as a system crash; and identifying multivariate correlations between multiple instrumentation signals and the undesirable system behavior.

In a further variation, determining the correlations involves using a non-linear, non-parametric regression technique, such as a multivariate state estimation technique, to determine the correlations.

In a variation on this embodiment, the instrumentation signals can include: signals associated with internal performance parameters maintained by software within the computer system; signals associated with physical performance parameters measured through sensors the computer system; and signals associated with canary performance parameters for synthetic user transactions, which are periodically generated for performance measuring purposes.

DETAILED DESCRIPTION

Figure 1:
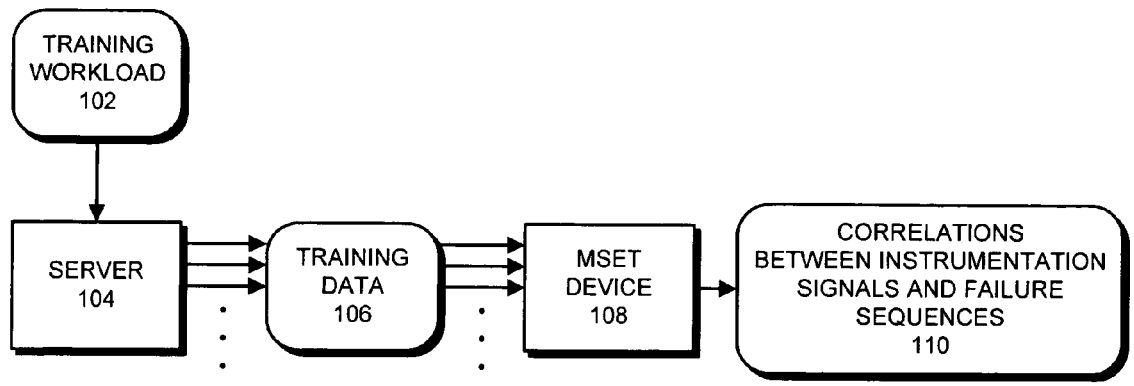
FIG. 1 illustrates a computer system configured to determine multivariate correlations between instrumentation signals and a failure sequence that is likely to lead to undesirable system behavior in accordance with an embodiment of the present invention.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The data structures and code described in this detailed description are typically stored on a computer readable storage medium, which may be any device or medium that can store code and/or data for use by a computer system. This includes, but is not limited to, magnetic and optical storage devices such as disk drives, magnetic tape, CDs (compact discs) and DVDs (digital versatile discs or digital video discs), and computer instruction signals embodied in a transmission medium (with or without a carrier wave upon which the signals are modulated). For example, the transmission medium may include a communications network, such as the Internet.

Monitoring Parameters in a Computer System

One embodiment of the present invention detects failure sequences that are likely to lead to undesirable system behavior by continuously monitoring values of physical variables and other parameters in a computer systems. In doing so, the present invention uses an advanced multivariate pattern recognition approach, which provides improved detection of performance parameters drifting out of specification.

More specifically, the present invention continuously monitors a number of different types of instrumentation signals during operation of the server. The monitored parameters can include "internal parameters," such as performance parameters having to do with throughput, transaction latencies, queue lengths, load on the CPU and memories, I/O traffic, bus saturation metrics, and FIFO overflow statistics; "canary parameters," such as distributed synthetic user transactions that give user quality-of-service metrics 24×7; and "physical parameters," such as distributed internal temperatures, environmental variables, currents, voltages, and time-domain reflectometry readings.

The foregoing instrumentation parameters are monitored continuously with an advanced statistical pattern recognition technique. One embodiment of the present invention uses a class of techniques known as "nonlinear, nonparametric regression techniques," such as the "Multivariate State Estimation Technique," MSET. Alternatively, the present invention can use other pattern recognition techniques, such as neural networks. In each case, the pattern recognition module "learns" the behavior of all the monitored variables, and is able to estimate what each signal "should be" on the basis of past learned behavior and on the basis of the current readings from all correlated variables. Moreover, the pattern recognition module learns multivariate correlations between multiple instrumentation parameters and failure sequences that are likely to lead to undesirable system behavior.

Note that MSET can be used to provide sensitive annunciation of the incipience or onset of failure sequences that are likely to lead to undesirable system behavior as is described in more detail below with reference to FIGS. 1–4.

Also note in additional to detecting failure sequences that are likely to lead to undesirable system behavior, these advanced pattern recognition techniques can be used for a variety of other beneficial reasons. These include: detection of thermal anomalies in servers, proactive detection of software aging problems in servers; dynamic provisioning for optimization of energy utilization; improved proactive detection of anomalies in the dynamical performance of servers; improved performance management; and self-healing and closed-loop autonomic control.

Determining Correlations

Figure 2:
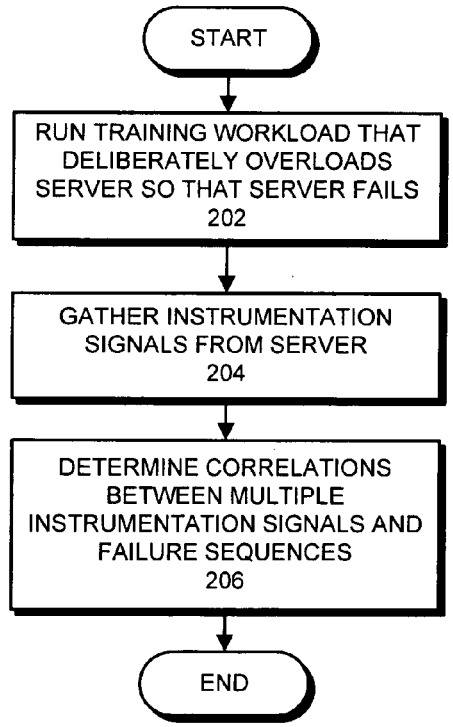
FIG. 2 presents a flow chart of the process of determining multivariate correlations between instrumentation signals and a failure sequence that is likely to lead to undesirable system behavior in accordance with an embodiment of the present invention.

FIGS. 1 and 2 illustrate the process of determining correlations between instrumentation signals in accordance with an embodiment of the present invention. In this embodiment, a training workload 102 is executed on a server 104 to produce instrumentation signals from potentially hundreds of sensors associated with system components within server 104 (step 202). In one embodiment of the present invention, this training workload 102 is a workload that deliberately overloads server 104 until server 104 fails. For example, if server 104 is a web server, training workload 102 can generate so many browser sessions on server 104 that server 104 can no longer operate. Furthermore, training workload 102 will ideally generate many different types of system crashes in order to learn many different types of failure sequences.

In one embodiment of the present invention, the system components from which the instrumentation signals originate are field replaceable units (FRUs), which can be independently monitored as is described below. Note that all major system units, including both hardware and software, can be decomposed into FRUs. (For example, a software FRU can include, an operating system, a middleware component, a database, or an application.)

In one embodiment of the present invention, training workload 102 can additionally include other types of workloads, which may not necessarily lead to undesirable system behavior. For example, training workload 102 can include: (1) no load, which enables the system to learn patterns during quiescent system operation; (2) a maximum load, which can be generated by a mathematical package, such as LinPack; and (3) a deterministic load, for example, generated with a multi-frequency, sinusoidal dynamical system characterization technique (see published U.S. Patent Application No. U.S. 20020198684A1, entitled "Method and Apparatus to Facilitate Measurement of Quality-of-Service Performance of a Network Server," by inventors Kenny C. Gross and David M. Fishman).

Also note that the present invention is not meant to be limited to server computer systems. In general, the present invention can be applied to any type of computer system. This includes, but is not limited to, a computer system based on a microprocessor, a mainframe computer, a digital signal processor, a portable computing device, a personal organizer, a device controller, and a computational engine within an appliance. Furthermore, the present invention can also be applied to a networked collection of servers.

The instrumentation signals are gathered from server 104 to form a set of training data 106 (step 204). In one embodiment of the present invention, the instrumentation signals are gathered through a "telemetry harness," which provides real-time outputs for the instrumentation signals. Note that these instrumentation signals can include signals associated with physical performance parameters measured through sensors the computer system. For example, the physical parameters can include distributed temperatures within the computer system, relative humidity, cumulative or differential vibrations within the computer system, fan speed, acoustic signals, current noise, voltage noise, time-domain reflectometry (TDR) readings, and miscellaneous environmental variables.

These instrumentation signals can also include signals associated with internal performance parameters maintained by software within the computer system. For example, these internal performance parameters can include system throughput, transaction latencies, queue lengths, load on the central processing unit, load on the memory, load on the cache, I/O traffic, bus saturation metrics, FIFO overflow statistics, available free memory, shared memory pool utilization, available disk capacity, and various operational profiles gathered through "virtual sensors" located within the operating system.

These instrumentation signals can also include signals associated with canary performance parameters for synthetic user transactions, which are periodically generated for performance measuring purposes.

This training data feeds into a multivariate state estimation technique (MSET) module 108, which determines a set of correlations between instrumentation signals 110 (step 206), as well as multivariate correlations between instrumentation signals and a subsequent system crash. Note that the term "MSET" as used in this specification refers to a multivariate state estimation technique, which loosely represents a class of pattern recognition algorithms. For example, see [Gribok] "Use of Kernel Based Techniques for Sensor Validation in Nuclear Power Plants," by Andrei V. Gribok, J. Wesley Hines, and Robert E. Uhrig, *The Third American Nuclear Society International Topical Meeting on Nuclear Plant Instrumentation and Control and Human-Machine Interface Technologies*, Washington D.C., Nov. 13–17, 2000. This paper outlines several different pattern recognition approaches. Hence, the term "MSET" as used in this specification can refer to (among other things) any technique outlined in [Gribok], including Ordinary Least Squares (OLS), Support Vector Machines (SVM), Artificial Neural Networks (ANNs), MSET, or Regularized MSET (RMSET).

Once these correlations have been determined by MSET device 108, they can be used to determine which combinations of performance parameters are efficient predictors of failure sequences that are likely to lead to undesirable system behavior as is described below with reference to FIGS. 3 and 4.

Detecting a Failure Sequence

Figure 3:
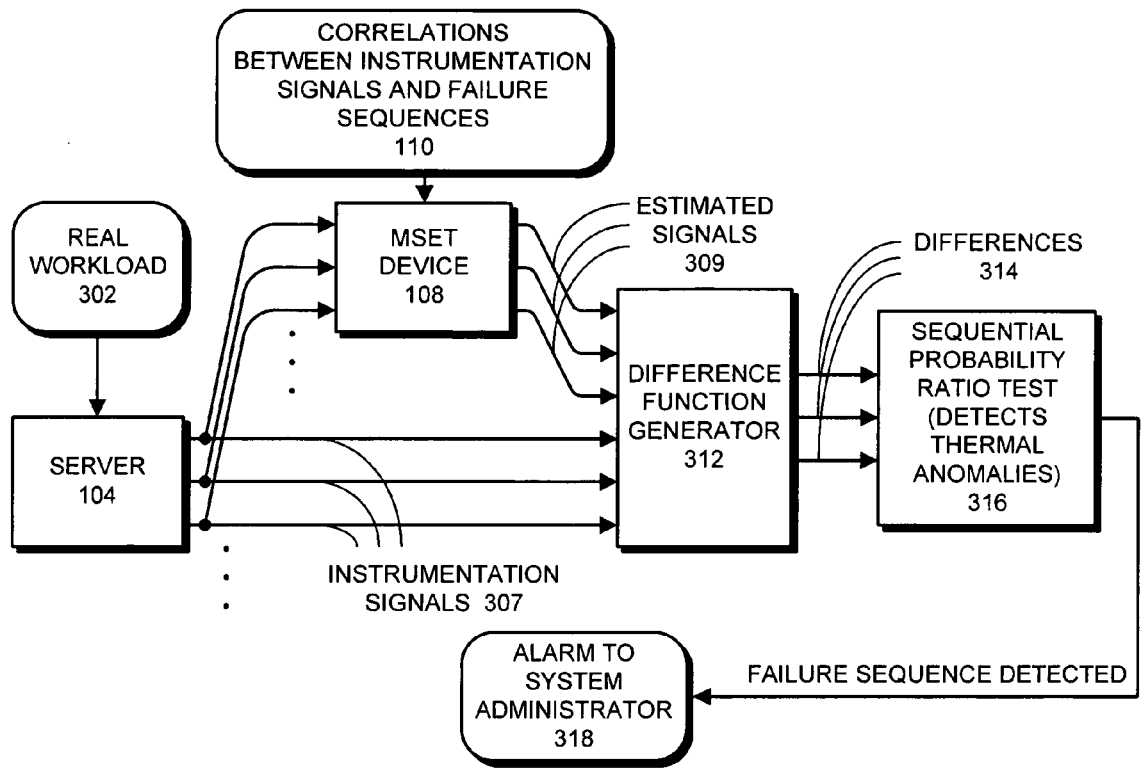
FIG. 3 illustrates a system configured to detect and correct failure sequences in accordance with an embodiment of the present invention.
Figure 4:
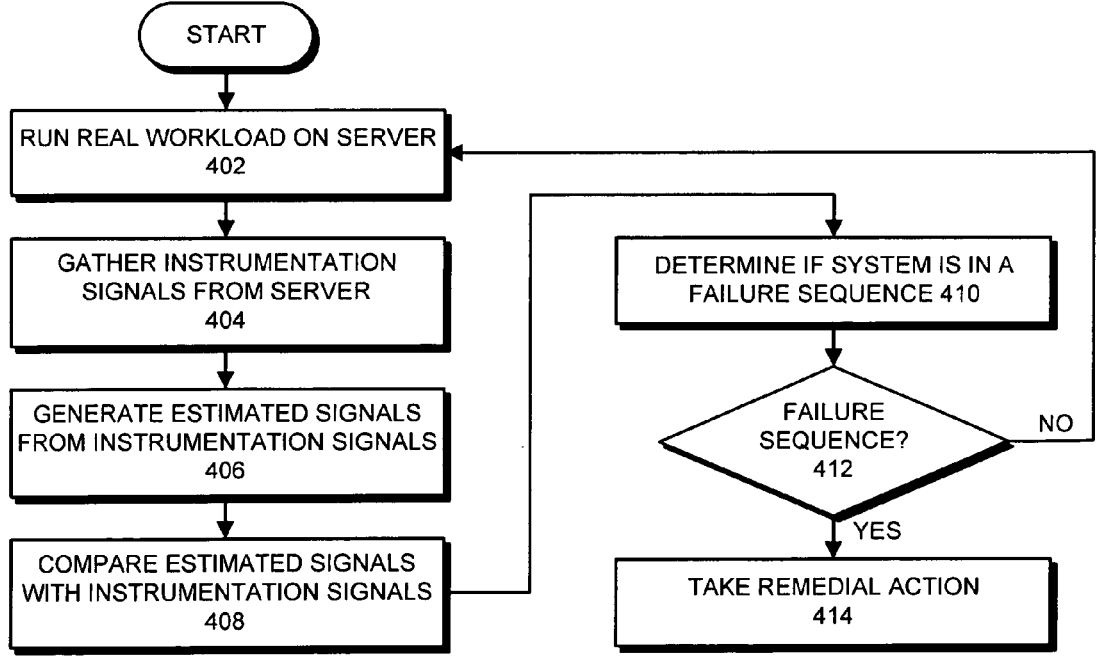
FIG. 4 presents a flow chart illustrating the process of detecting and correcting failure sequences in accordance with an embodiment of the present invention.

FIGS. 3 and 4 illustrate a process monitors system performance parameters to detect failure sequences in accordance with an embodiment of the present invention. The process starts when a real workload 302 is executed on server 104 (step 402). During this execution, the process gathers instrumentation signals 307 from possibly hundreds of sensors within server 104 (step 404). These instrumentation signals feed into MSET device 108, which uses previously determined correlations between instrumentation signals 110 to generate a set of estimated signals 309 (step 406). Note that this process generates an estimated signal for each instrumentation signal. Also, note that each estimated signal can be generated by applying predetermined correlations with other signals to the actual measured values for the other signals.

Next, the instrumentation signals 307 and the estimated signals 309 feed into difference function generator 312, which compares the signals by computing pairwise differences 314 between each instrumentation signal and its corresponding estimated signal (step 408).

Next, the set of differences 314 feeds into a sequential probability ratio test (SPRT) module 316, which examines the differences 314 to determine if the system is in a failure sequence that is likely to lead to undesirable system behavior (step 410). Note that the SPRT is an extremely sensitive binary hypothesis test that can detect very subtle changes in time series signals with a high confidence factor, a high avoidance of "false positives," and a short time-to-detection. In fact, the SPRT method has the shortest mathematically possible time to annunciation for detecting a subtle anomaly in noisy process variables. In general, the system can determine that system is in a failure sequence in a number of ways. For example, the system can detect a failure sequence if a function of multiple differences exceeds a predetermined threshold value. In another embodiment of the present invention, a failure sequence is detected without examining differences 314 between instrumentation signals and corresponding estimated signals, but instead by looking for patterns in instrumentation signals 307, which indicate that the system is in failure sequence that is likely to lead to undesirable system behavior.

If at step 410, the system has determined that the system is not in a failure sequence, the system returns to step 402 to continue running the real workload. Otherwise, if the system determines that the system has entered a failure sequence, the system takes a remedial action (step 414). This remedial action can involve communicating an alarm to a system administrator so that the system administrator can take a remedial action. Note that the remedial action can involve performing a number of different actions, such as, not granting new resource requests, flushing the shared memory pool and/or killing stale job processes. The remedial action can also involve not allocating new processes, and/or terminating recently created processes. Note that although terminating processes can be disruptive, it is significantly less disruptive to terminate a few processes than to allow undesirable system behavior, such as a system crash to occur, which terminates all processes.

In one embodiment of the present invention, instead of (or in addition to) sending an alarm to a system administrator, the system is configured to automatically perform a remedial action.

Also note that a multivariate prediction mechanism generally provides a more accurate predictor of undesirable system behavior. A more accurate prediction can provide more time to perform remedial actions to avert a system crash, and can reduce the chance of a misprediction of a crash, and can thereby avoid unnecessary remedial actions.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for detecting a failure sequence or other undesirable system behavior in a computer system and subsequently taking a corresponding remedial action, comprising:
receiving instrumentation signals from the computer system while the computer system is operating;
determining from the instrumentation signals if the computer system is in a failure sequence that is likely to lead to undesirable system behavior, such as a system crash, wherein determining if the computer system is in a failure sequence involves:
determining correlations between instrumentation signals in the computer system, wherein determining the correlations involves using a non-linear, non-parametric regression technique to determine the correlations, whereby the correlations can subsequently be used to generate estimated signals,
deriving estimated signals for a number of instrumentation signals, wherein each estimated signal is derived from correlations with other instrumentation signals, and
comparing an actual signal with an estimated signal for a number of instrumentation signal to determine whether the computer system is in a failure sequence;
wherein the determination involves considering predetermined multivariate correlations between multiple instrumentation signals and a failure sequence that is likely to lead to undesirable system behavior; and
if the computer system is in a failure sequence that is likely to lead to undesirable system behavior, taking a remedial action.

2. The method of claim 1, wherein taking the remedial action involves generating an alarm.

3. The method of claim 2, wherein generating the alarm involves communicating the alarm to a system administrator so that the system administrator can take the remedial action.

4. The method of claim 3, wherein communicating the alarm to the system administrator involves communicating information specifying the nature of the failure sequence to the system administrator.

5. The method of claim 1, wherein taking the remedial action can involve: killing processes, blocking creation of new processes, or throwing away work, until the system is no longer in a failure sequence that is likely to lead to undesirable system behavior.

6. The method of claim 1, wherein comparing an actual signal with an estimated signal involves using sequential detection methods to detect changes in a relationship between the actual signal and the estimated signal.

7. The method of claim 6, wherein the sequential detection methods include the Sequential Probability Ratio Test (SPRT).

8. The method of claim 1, wherein determining the correlations involves:
deliberately overloading the computer system during a test mode to produce undesirable system behavior, such as a system crash; and
identifying multivariate correlations between multiple instrumentation signals and the system crash.

9. The method of claim 1, wherein the non-linear, non-parametric regression technique can include a multivariate state estimation technique.

10. The method of claim 1, wherein the instrumentation signals can include:
signals associated with internal performance parameters maintained by software within the computer system;
signals associated with physical performance parameters measured through sensors the computer system; and
signals associated with canary performance parameters for synthetic user transactions, which are periodically generated for performance measuring purposes.

11. A computer-readable storage medium storing instructions that when executed by a computer cause the computer to perform a method for detecting a failure sequence or other undesirable system behavior in a computer system and subsequently taking a corresponding remedial action, wherein the computer-readable storage medium includes magnetic and optical storage devices, disk drives, magnetic tape, CDs (compact discs), and DVDs (digital versatile discs or digital video discs), the method comprising: the method comprising:
receiving instrumentation signals from the computer system while the computer system is operating;
determining from the instrumentation signals if the computer system is in a failure sequence that is likely to lead to undesirable system behavior, such as a system crash; wherein determining if the computer system is in a failure sequence involves:
determining correlations between instrumentation signals in the computer system, wherein determining the correlations involves using a non-linear, non-parametric regression technique to determine the correlations, whereby the correlations can subsequently be used to generate estimated signals,
deriving estimated signals for a number of instrumentation signals, wherein each estimated signal is derived from correlations with other instrumentation signals, and
comparing an actual signal with an estimated signal for a number of instrumentation signal to determine whether the computer system is in a failure sequence;
wherein the determination involves considering predetermined multivariate correlations between multiple instrumentation signals and a failure sequence that is likely to lead to undesirable system behavior; and if the computer system is in a failure sequence that is likely to lead to undesirable system behavior, taking a remedial action.

12. The computer-readable storage medium of claim 11, wherein taking the remedial action involves generating an alarm.

13. The computer-readable storage medium of claim 12, wherein generating the alarm involves communicating the alarm to a system administrator so that the system administrator can take the remedial action.

14. The computer-readable storage medium of claim 13, wherein communicating the alarm to the system administrator involves communicating information specifying the nature of the failure sequence to the system administrator.

15. The computer-readable storage medium of claim 11, wherein taking the remedial action can involve: killing processes, blocking creation of new processes, or throwing away work, until the system is no longer in a failure sequence that is likely to lead to undesirable system behavior.

16. The computer-readable storage medium of claim 11, wherein comparing an actual signal with an estimated signal involves using sequential detection methods to detect changes in a relationship between the actual signal and the estimated signal.

17. The computer-readable storage medium of claim 16, wherein the sequential detection methods include the Sequential Probability Ratio Test (SPRT).

18. The computer-readable storage medium of claim 11, wherein determining the correlations involves:
 deliberately overloading the computer system during a test mode to produce undesirable system behavior, such as a system crash; and
 identifying multivariate correlations between multiple instrumentation signals and the system crash.

19. The computer-readable storage medium of claim 11, wherein the non-linear, non-parametric regression technique can include a multivariate state estimation technique.

20. The computer-readable storage medium of claim 11, wherein the instrumentation signals can include:
 signals associated with internal performance parameters maintained by software within the computer system;
 signals associated with physical performance parameters measured through sensors the computer system; and
 signals associated with canary performance parameters for synthetic user transactions, which are periodically generated for performance measuring purposes.

21. An apparatus that detects a failure sequence or other undesirable system behavior in a computer system and subsequently takes a corresponding remedial action, comprising:
 a monitoring mechanism configured to monitor instrumentation signals from the computer system while the computer system is operating;
 a determination mechanism configured to determine from the instrumentation signals if the computer system is in a failure sequence that is likely to lead to undesirable system behavior, such as a system crash, wherein determining if the computer system is in a failure sequence involves:
  determining correlations between instrumentation signals in the computer system, wherein determining the correlations involves using a non-linear, non-parametric regression technique to determine the correlations, whereby the correlations can subsequently be used to generate estimated signals,
  deriving estimated signals for a number of instrumentation signals, wherein each estimated signal is derived from correlations with other instrumentation signals, and
  comparing an actual signal with an estimated signal for a number of instrumentation signal to determine whether the computer system is in a failure sequence;
 wherein the determination mechanism is based on multivariate correlations between multiple instrumentation signals and a failure sequence that is likely to lead to undesirable system behavior; and
 a remediation mechanism that is configured to take a remedial action if the computer system is in a failure sequence that is likely to lead to undesirable system behavior.

* * * * *

UNITED STATES PATENT AND TRADEMARK OFFICE
CERTIFICATE OF CORRECTION

| | | |
|---|---|---|
| PATENT NO. | : 7,181,651 B2 | Page 1 of 1 |
| APPLICATION NO. | : 10/777532 | |
| DATED | : February 11, 2004 | |
| INVENTOR(S) | : Kenny C. Gross | |

It is certified that error appears in the above-identified patent and that said Letters Patent is hereby corrected as shown below:

In claim 11 (at column 8, line 44), please delete the phrase, "the method comprising: the method comprising" and replace with the phrase --the method comprising:--.

Signed and Sealed this

Seventeenth Day of April, 2007

JON W. DUDAS
*Director of the United States Patent and Trademark Office*

UNITED STATES PATENT AND TRADEMARK OFFICE
CERTIFICATE OF CORRECTION

PATENT NO.         : 7,181,651 B2
APPLICATION NO. : 10/777532
DATED              : February 20, 2007
INVENTOR(S)       : Kenny C. Gross It is certified that error appears in the above-identified patent and that said Letters Patent is hereby corrected as shown below:

In claim 11 (at column 8, line 44), please delete the phrase, "the method comprising: the method comprising" and replace with the phrase --the method comprising:--.

This certificate supersedes Certificate of Correction issued April 17, 2007.

Signed and Sealed this

Eighth Day of May, 2007

JON W. DUDAS
*Director of the United States Patent and Trademark Office*